(12) United States Patent  (10) Patent No.: US 7,746,664 B2
Zhang et al.  (45) Date of Patent: Jun. 29, 2010

(54) MOUNTING APPARATUS FOR EXPANSION CARD (75) Inventors: Guang-Yi Zhang, Shenzhen (CN); Zhe Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 190 days.

(21) Appl. No.: 12/138,649

(22) Filed: Jun. 13, 2008

(65) Prior Publication Data

US 2009/0168341 A1 Jul. 2, 2009

(30) Foreign Application Priority Data

Dec. 27, 2007 (CN) .................. 2007 1 0203464

(51) Int. Cl.
*H05K 7/12* (2006.01)
(52) U.S. Cl. ................. 361/801; 361/759; 361/747; 312/223.2
(58) Field of Classification Search ........... 361/801, 361/759
See application file for complete search history.

(56) References Cited

U.S. PATENT DOCUMENTS

| 6,231,139 | B1 * | 5/2001 | Chen .................. 312/223.2 |
| 6,430,056 | B1 * | 8/2002 | Chen .................... 361/759 |
| 6,549,398 | B2 * | 4/2003 | Chen .................. 361/679.58 |
| 6,552,913 | B2 * | 4/2003 | Tournadre ................ 361/759 |
| 6,671,181 | B2 * | 12/2003 | Kaminski ................ 361/759 |
| 6,972,370 | B2 * | 12/2005 | Wang et al. .............. 174/535 |
| 7,001,002 | B2 * | 2/2006 | Wei .................... 312/223.2 |
| 7,004,777 | B2 * | 2/2006 | Lien et al. ................ 439/327 |
| 7,035,117 | B2 * | 4/2006 | Chen et al. .............. 361/801 |
| 7,057,902 | B2 * | 6/2006 | Li ...................... 361/801 |
| 7,110,251 | B2 * | 9/2006 | Wu .................... 361/679.32 |
| 7,130,200 | B1 * | 10/2006 | Liu ..................... 361/801 |
| 7,254,041 | B2 * | 8/2007 | Chen et al. .............. 361/801 |
| 7,443,666 | B2 * | 10/2008 | Huang ................ 361/679.32 |
| 7,471,507 | B2 * | 12/2008 | Huang ................ 361/679.55 |
| 7,525,811 | B2 * | 4/2009 | Xiao .................... 361/759 |
| 7,564,696 | B1 * | 7/2009 | Winick et al. ............ 361/801 |
| 7,573,704 | B2 * | 8/2009 | Chen et al. ............ 361/679.32 |
| 7,586,757 | B2 * | 9/2009 | Zhang et al. ............. 361/802 |
| 7,596,001 | B2 * | 9/2009 | Tang .................... 361/801 |
| 2003/0206406 | A1 * | 11/2003 | Vier et al. ............... 361/801 |
| 2004/0170007 | A1 * | 9/2004 | Chen .................... 361/801 |
| 2004/0174687 | A1 * | 9/2004 | Wang et al. .............. 361/801 |

(Continued)

*Primary Examiner*—Lisa Lea-Edmonds
(74) *Attorney, Agent, or Firm*—D. Austin Bonderer (57) ABSTRACT

A mounting apparatus for mounted an expansion card to a computer case, includes an expansion card mount, and a locking device mounted in the computer. The expansion card mount includes a fixing board, the fixing board including a locking post extending. The computer includes a PCB having a female connector, and a rear plate defining an opening. The expansion card includes a male connector and is fixed to the fixing board. The expansion card together with the expansion card mount can be inserted through the opening of the rear plate in order to make the male connector of the expansion card to be plugged in the female connector of the PCB. At the same time, the locking post of the expansion card mount is locked by the locking device and the expansion card mount is mounted in the opening of the rear plate.

18 Claims, 8 Drawing Sheets

U.S. PATENT DOCUMENTS

| | | | |
|---|---|---|---|
| 2007/0030631 A1* | 2/2007 | Liang et al. | 361/600 |
| 2007/0175130 A1* | 8/2007 | Chen et al. | 52/235 |
| 2007/0242442 A1* | 10/2007 | Dai | 361/801 |
| 2008/0013297 A1* | 1/2008 | Tao et al. | 361/801 |
| 2008/0225475 A1* | 9/2008 | Zhang et al. | 361/683 |
| 2009/0168376 A1* | 7/2009 | Tang | 361/756 |
| 2009/0244862 A1* | 10/2009 | Wu et al. | 361/759 |

* cited by examiner

MOUNTING APPARATUS FOR EXPANSION CARD

BACKGROUND

1. Field of the Invention

The present invention relates to mounting apparatuses, and more particularly to a mounting apparatus for an expansion card.

2. Description of Related Art

Computer systems typically require or include expansion cards which extend the capabilities of computer systems by providing dedicated hardware to achieve a variety of tasks. A conventional expansion card is typically installed in a computer case by some screws. However, it is not convenient to drive screws to install or remove the expansion card in a narrow space of the computer case.

What is desired, therefore, is a mounting apparatus which facilitates installing and removing the expansion card in or from a computer case.

SUMMARY

An exemplary mounting apparatus for an expansion card includes an expansion card mount for fixing the expansion card, and a locking device. The expansion card mount includes a locking post extending therefrom. The locking device includes a fixing bracket, a key bar, and an elastic unit. The fixing bracket is configured to be mounted to a computer case. The key bar is slidably mounted in the fixing bracket. The elastic unit is connected between the fixing bracket and the key bar to restrict the sliding movement of the key bar. A first locking hole is defined in the fixing bracket. A second locking hole is defined in the key bar. An engaging protrusion extends into the second locking hole from a wall bounding the second locking hole. When the key bar is assembled in the fixing bracket, the first locking hole of the fixing bracket generally overlaps with the second locking hole of the key bar and the elastic unit is in a relaxed state. Then the expansion card mount is moved to make the locking post thereof engage in the first locking hole of the fixing bracket and the second locking hole of the key bar. The locking post pushes against the engaging protrusion to cause the key bar to slide within the fixing bracket allowing passage of the locking post into the first and second locking holes and the elastic unit is deformed. Once the locking post passes over the engaging protrusion, restoration force of the elastic unit causes the key bar to slide back, and the locking post is trapped in position by the engaging protrusion.

Other advantages and novel features will become more apparent from the following detailed description of embodiment when taken in conjunction with the accompanying drawings, in which:

DETAILED DESCRIPTION

Figure 1:
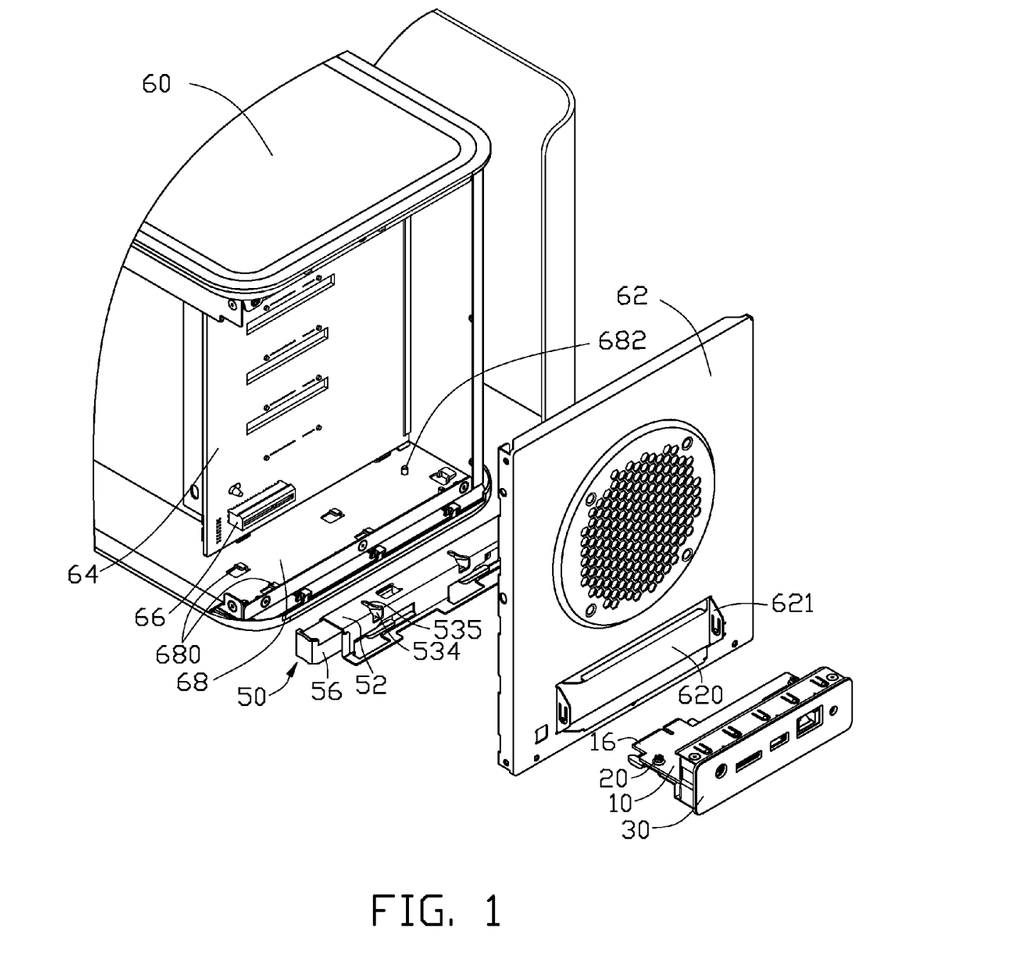
FIG. 1 is an exploded, isometric view of a mounting apparatus in accordance with an embodiment of the present invention together with a computer case, and an expansion card, the mounting apparatus including an expansion card mount, and a locking device.
Figure 2:
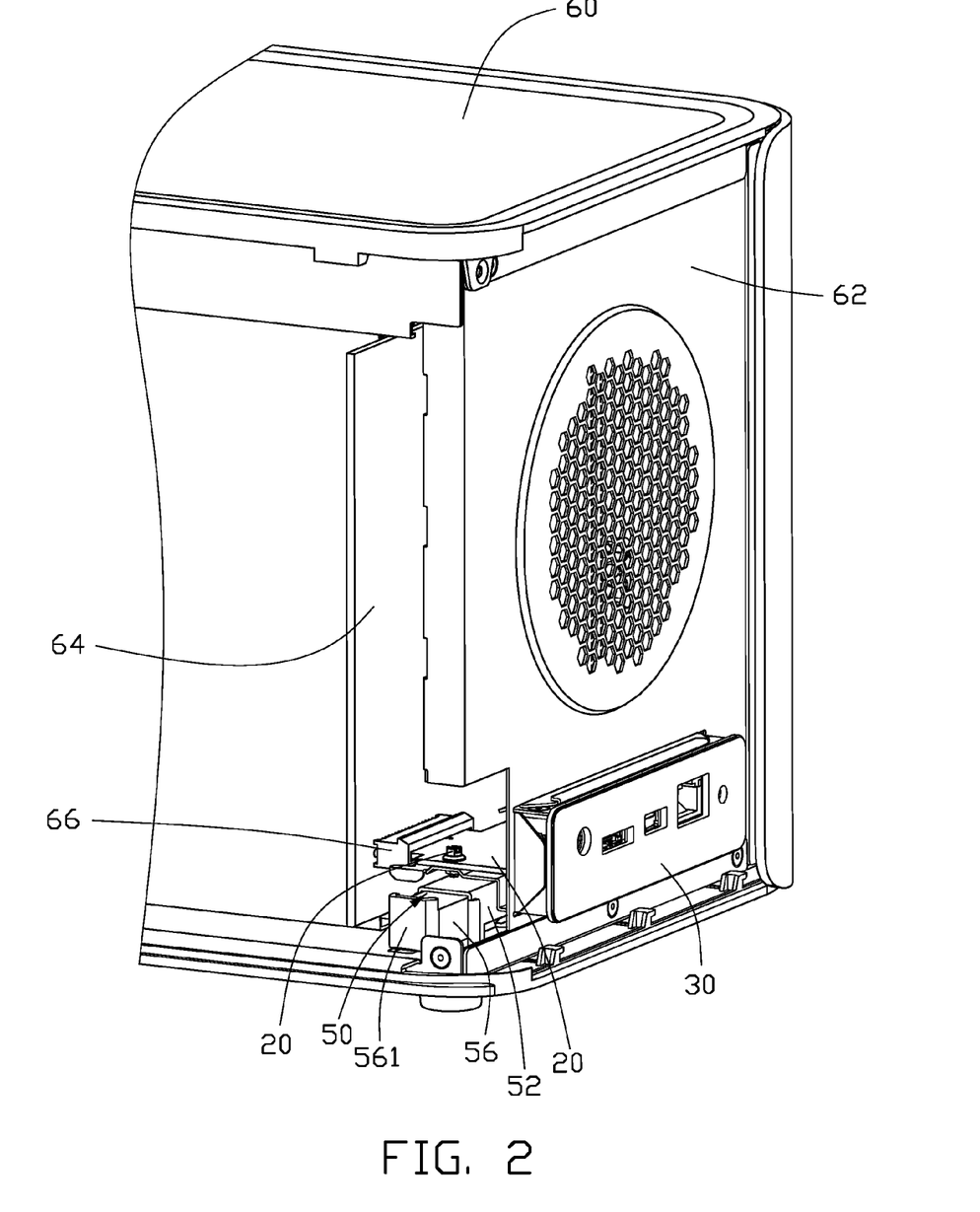
FIG. 2 is an assembled view of FIG. 1.

Referring to FIGS. 1 and 2, a mounting apparatus in accordance with an embodiment of the present invention is used for removably installing an expansion card 10 in a computer case 60.

The computer case 60 includes a motherboard 64 having a female connector 66, a bottom plate 68, and a rear plate 62 defining a rectangular opening 620 therein. The bottom plate 68 includes a pair of spaced mounting posts 682 extending upward therefrom, and two pairs of spaced elastic hooks 680 extending therefrom and bent towards a left side of the computer case 60. The elastic hooks 680 are respectively located at four corners of a rectangular area of the bottom plate 68. The rear plate 62 has four lips that perpendicularly extend from four edges bounding the opening 620 towards the outside of the rear plate 62. Two of the lips each have an elastic member 621 set thereon.

The expansion card 10 includes a male connector 16 extending from an edge thereof for being plugged in the female connector 66 of the motherboard 64, and two mounting holes 12 (see FIG. 3) defined therein.

Figure 3:
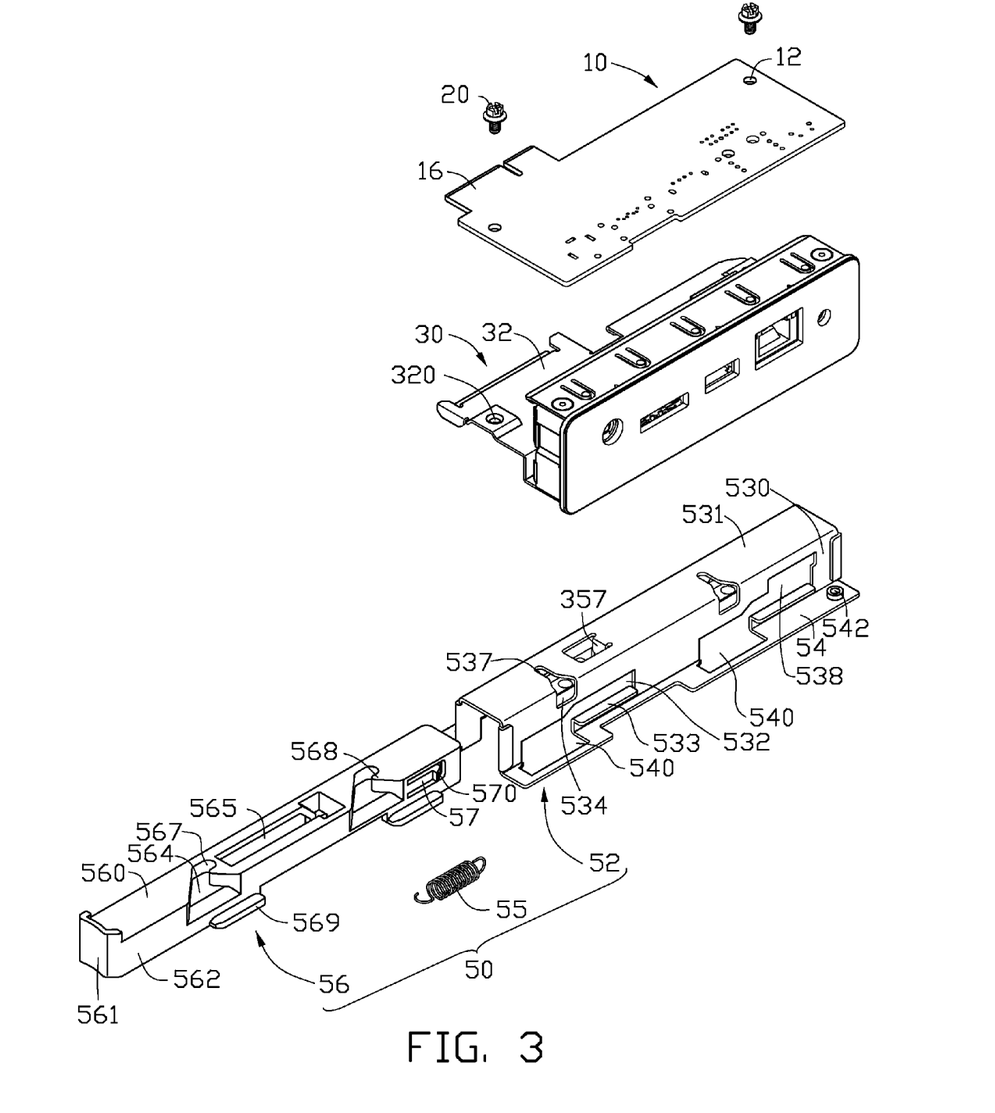
FIG. 3 is an exploded, isometric view of the mounting apparatus and the expansion card in FIG. 1.

Referring also to FIG. 3, the mounting apparatus includes an expansion card mount 30 mounted to the rear plate 62 of the computer case 60 and configured for fixing the expansion card 10. A locking device 50 is mounted to the bottom plate 68 of the computer case 60 and configured for locking the expansion card mount 30 in place.

Figure 4:
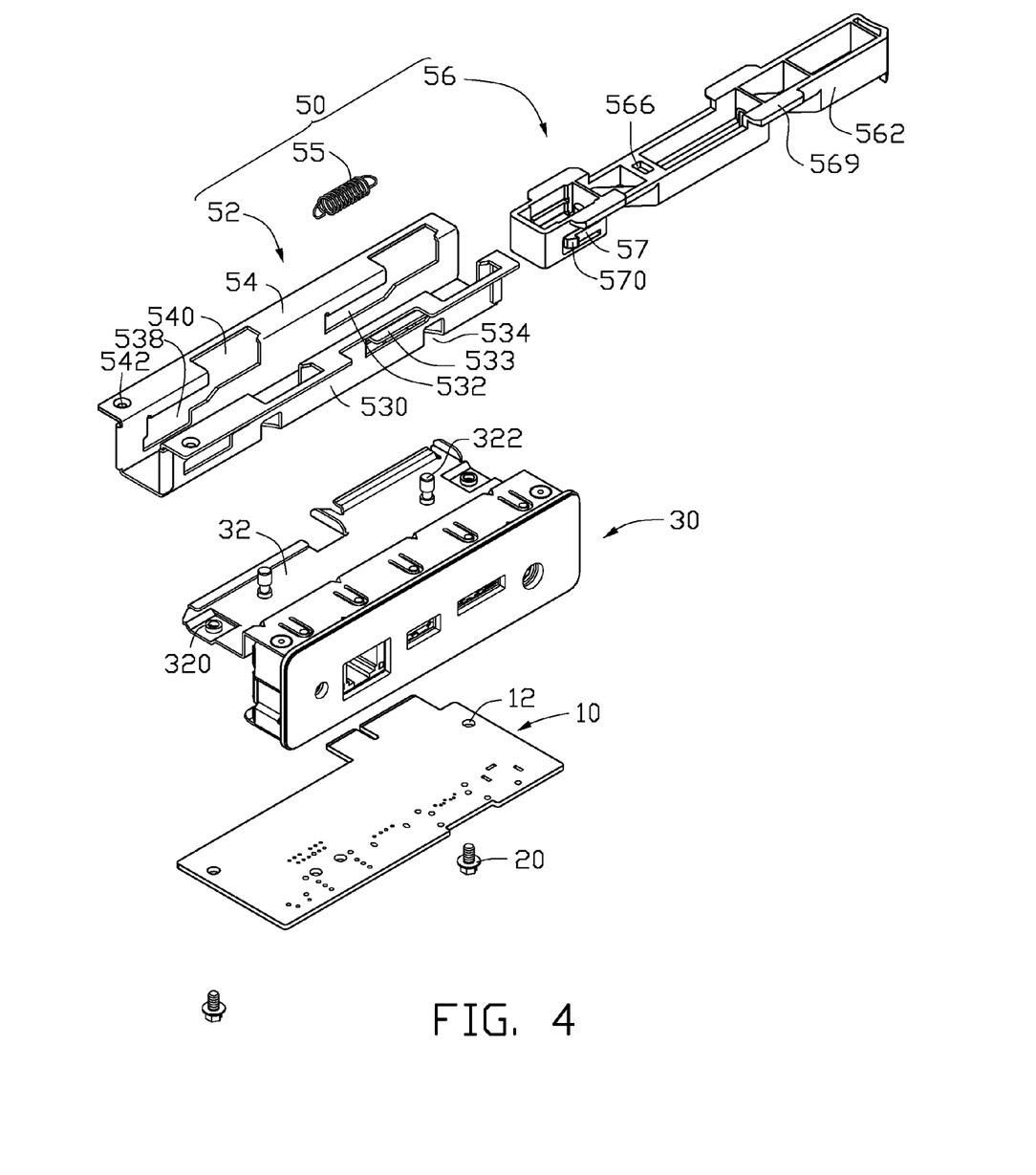
FIG. 4 is similar to FIG. 3, but viewed from another aspect.

The expansion card mount 30 includes an interface board having a plurality of interfaces mounted thereon, and a fixing board 32 perpendicularly extending from the interface board. Two mounting holes 320 are defined in the fixing board 32. The expansion board 10 is fixed to the top of the fixing board 32 via two screws 20 respectively inserted through the mounting holes 12 of the expansion board 10 and engaged in the corresponding mounting holes 320 of the fixing board 32. The expansion board 10 is electrically connected to the interfaces of the interface board of the expansion card mount 30. Two locking posts 322 (see FIG. 4) extend downward from the bottom of the fixing board 32 of the expansion card mount 30 for engaging with the locking device 50.

In mounting the expansion card mount 30 to the rear plate 62 of the computer case 60, the fixing board 32 of the expansion card mount 30 together with the expansion card 10 goes through the opening 620 of the rear plate 62. The interface board of the expansion card mount 30 is clamped by the four lips around the opening 620 and grounded by engaging with the two elastic members 621.

The locking device 50 includes a fixing bracket 52, a key bar 56, and a spring 55. A fixing bracket 52 is mounted to the bottom plate 68 of the computer case 60. The key bar 56 is slidably mounted in the fixing bracket 52. The spring 55 is connected between the fixing bracket 52 and the key bar 56 configured for restricting the sliding movement of the key bar 56.

The fixing bracket 52 includes an elongate rectangular top board 531, two side boards 530 respectively extending perpendicularly downward from the two opposite long edges of the top board 531, and two fixing pieces 54 respectively extending from lower edges of the two side boards 530. Each fixing piece 54 extends to the outside of the fixing bracket 52 and is perpendicular to the corresponding side board 530.

For mounting the fixing bracket 52 to the bottom plate 68 of the computer case 60, the fixing pieces 54 of the fixing bracket 52 each define a hole 542 and two access holes 540. The hole 542 is defined near the right end of the fixing bracket 52 (see FIG. 3) corresponding to the pair of mounting posts 682 of the bottom plate 68. The access holes 540 is defined corresponding to the two pairs of elastic hooks 680 of the bottom plate 68. In mounting the fixing bracket 52 to the bottom plate 68 of the computer case 60, the fixing bracket 52 is operated to make the elastic hooks 680 of the bottom plate 68 go through the corresponding access holes 540 thereof. The right end of the fixing bracket 52 is raised a little and is slid until the elastic hooks 680 of the bottom plate 68 of the computer case 60 catch the corresponding fixing pieces 54 of the fixing bracket 52. Then the right end of the fixing bracket 52 is released to allow the mounting posts 682 of the bottom plate 68 to engage in the corresponding holes 542 of the fixing pieces 54 of the fixing bracket 52.

Each side board 530 of the fixing bracket 52 defines an interference avoiding hole 538 near the right end of the fixing bracket 52, and another interference avoiding hole 532 near the left end of the fixing bracket 52. A left end of each interference avoiding hole 538, 532 communicates with neighboring access hole 540 of the corresponding fixing piece 54 of the fixing bracket 52. A supporting piece 533 extends out from a lower edge bounding each interference avoiding hole 538, 532 of the fixing bracket 52 over and parallel to the corresponding fixing piece 54 of the fixing bracket 52.

Two spaced first locking holes 534 are defined in the fixing bracket 52. The two first locking holes 534 are defined in the same side board 530 of the fixing bracket 52 and extend into the top board 531 of the bracket 52. Each first locking hole 534 gradually becomes narrower from the corresponding side board 530 to the top board 531. A receiving portion 537 of each first locking hole 534 is formed adjacent an end of each first locking hole 534 in the top board 531. A catching piece 357 extends into the inner of the fixing bracket 52 from the top board 531 of the fixing bracket 52. The catching piece 357 is located between the two first locking holes 534.

The key bar 56 includes an operating portion 561 at its left end. Two sliding blocks 569 extend from each of opposite side surfaces 562 of the key bar 56 corresponding to the supporting pieces 533 of the fixing bracket 52. A rectangular hole is defined in each side surface 562 near the right end of the key bar 56. An elastic piece 57 is formed in each rectangular hole, and a blocking tab 570 extends out from the free end of each elastic piece 57. Two spaced second locking holes 564 are defined in the key bar 56, corresponding to the two first locking holes 534 of the fixing bracket 52. The two second locking holes 564 are defined in the same side surface 562 of the key bar 56. Each second locking hole 564 further extends into the top surface 560 from the side surface 562, and then extend to the right in the top surface 560. Thus, the right wall bounding each second locking holes 564 forms an engaging protrusion 568. Each second locking hole 564 gradually becomes narrower from the corresponding side surface 562 to the top surface 560. A receiving portion 567 of each second locking hole 564 is formed adjacent the corresponding engaging protrusion 568 at the end of each second locking hole 564 in the top surface 560. An interference avoiding hole 565 is defined in the top surface 560 of the key bar 56 between the two second locking hole 564 and corresponds to the catching piece 357 of the fixing bracket 52. A catching hole 566 (see FIG. 4) is defined in the bottom of the key bar 56.

Figure 5:
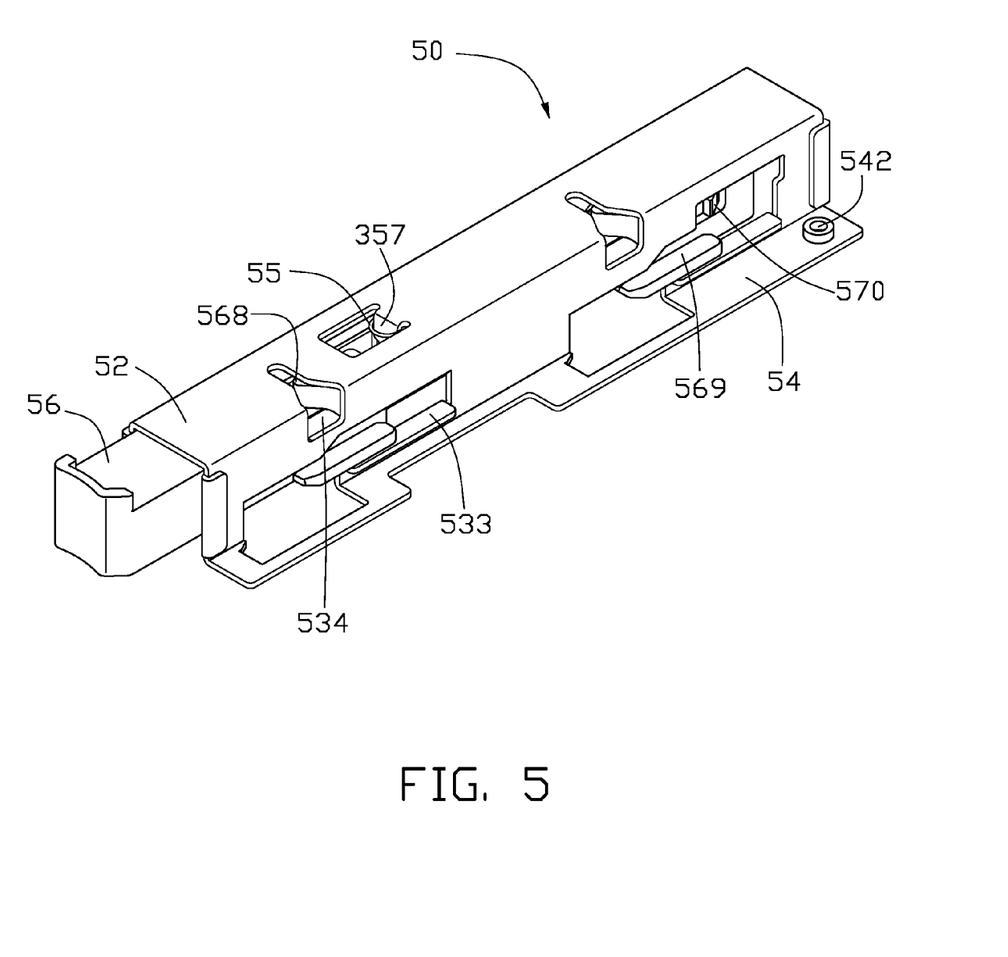
FIG. 5 is an isometric view of the locking device of the mounting apparatus of FIG. 3.
Figure 6:
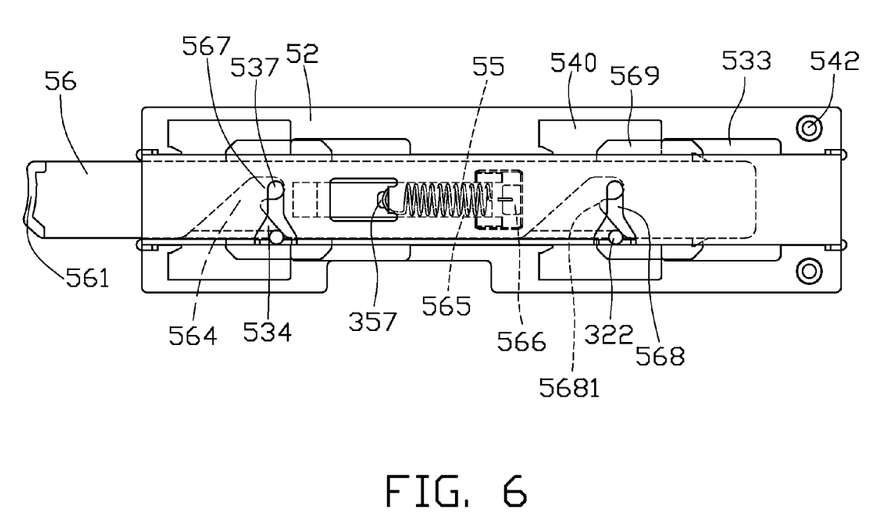
FIG. 6 is a top plan view of FIG. 5.

Referring also to FIG. 5, in mounting the key bar 56 to the fixing bracket 52, the sliding blocks 569 of the key bar 56 are operated to go through the corresponding access holes 540 of the fixing pieces 54 of the fixing bracket 52. At the same time the free end of the catching piece 357 of the fixing bracket 52 extends into the interference avoiding hole 565 of the key bar 562. The blocking tabs 570 of the elastic pieces 57 of the key bar 52 are pressed by corresponding side boards 530 of the fixing bracket 52, which leads to the elastic pieces 57 being elastically deformed. Then the key bar 56 is operated to make its sliding blocks 569 be supported by the corresponding supporting pieces 533 of the fixing bracket 52. The blocking tabs 570 of the elastic pieces 57 of the key bar 52 are placed in the corresponding interference avoiding holes 538 of the fixing bracket 52. Thus, the elastic deformation of the elastic pieces 57 are released, and then the blocking tabs 570 can prevent the key bar 56 from disengaging from the fixing bracket when the key bar 56 is slid to the left. As shown in FIG. 6, two ends of the spring 55 are respectively fixed to the catching piece 357 of the fixing bracket 52 and the catching hole 566 of the key bar 56. When the spring 55 is restored, the receiving portion 537 of each first receiving hole 534 of the fixing bracket overlaps with the receiving portion 567 of each second receiving hole 564 of the key bar 56.

Figure 7:
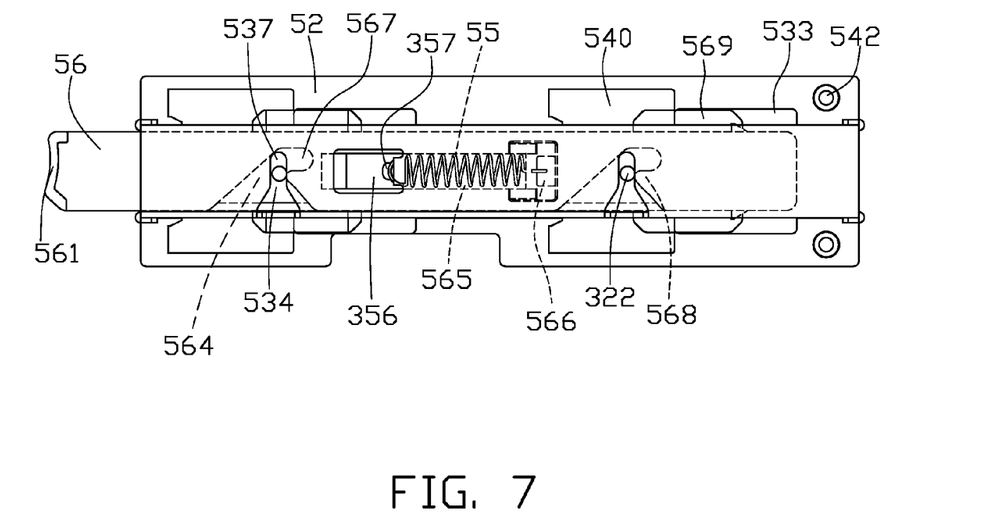
FIGS. 7 and 8 are similar to FIG. 6, respectively showing the locking device being in different states.
Figure 8:
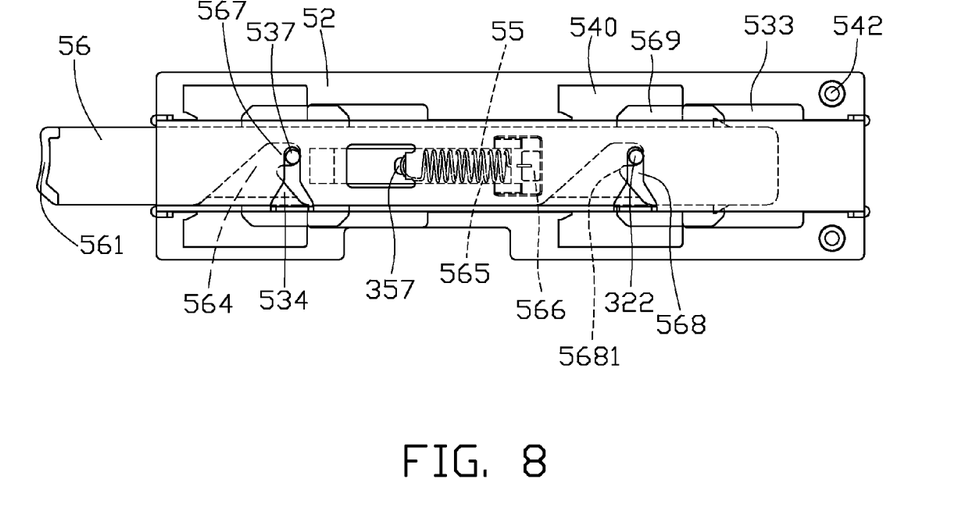

Referring to FIGS. 6 to 8, in locking the expansion card mount 30 (see FIG. 1) to the locking device 50, the locking posts 322 (see FIG. 4) of the expansion card mount 30 are moved into the corresponding first receiving hole 534 of the fixing bracket. Each locking post 322 firstly touches and moves along the engaging protrusion 568 of the corresponding second receiving hole 564 to push the key bar 56 to slide to the right. At the same time, the spring 55 is elongated. Then each locking post 322 reaches and passed an turning point 5681 (see FIG. 7) of the corresponding engaging protrusion 568. At the same time, the spring 55 is restored to pull the key bar 56 to slide back. Thus, each locking post 322 is received in both of the receiving portion 537 of the corresponding first receiving hole 534 of the fixing bracket and the receiving portion 567 of the corresponding second receiving hole 564 of the key bar 56. The engaging protrusions 568 of the key bar 56 prevent the corresponding locking posts 322 from being moved out. Thus, the expansion card mount 30 is locked to the locking device 50.

In unlocking the expansion card mount 30 from the locking device 50, the key bar 56 is operated to slide to the right while the spring 55 is elongated. Then the expansion card mount 30 can be moved to allow its locking posts to disengage from the locking device 50 while the spring 55 is restored.

Referring back to FIGS. 1 and 2, in use, the locking device 50 is mounted to the bottom plate 680 of the computer case 60. The expansion board 10 is mounted to the expansion card mount 30. The expansion card mount 30 is mounted to the rear plate 62 of the computer case, while the male connector 16 of the expansion board 10 is plugged in the female connector 66 of the motherboard 64. At the same time the expansion card mount 30 is locked by the locking device 50. Thus, the expansion board 10 is conveniently installed to the computer case 60. In removing the expansion board 10, the key bar 56 of the locking device 50 is operated to unlock the expansion card mount 30. Thus, the expansion board 10 can be conveniently removed from the computer case 60.

It is believed that the present embodiment and its advantages will be understood from the foregoing description, and they will be apparent that various changes may be made thereto without departing from the spirit and scope of the invention or sacrificing all of its material advantages, the examples hereinbefore described merely being preferred or exemplary embodiment of the invention.

What is claimed is:

1. A mounting apparatus for an expansion card, the mounting apparatus comprising:
   an expansion card mount for fixing the expansion card, the expansion card mount comprising of a locking post extending therefrom; and
   a locking device comprising of a fixing bracket configured to be mounted to a computer case, a key bar slidably mounted in the fixing bracket; and an elastic unit connected to the fixing bracket and the key bar;
   wherein a first locking hole is defined in the fixing bracket, a second locking hole is defined in the key bar, an engaging protrusion extends into the second locking hole from a wall bounding the second locking hole;
   wherein the first locking hole generally overlaps with the second locking hole when the elastic unit is in a relaxed state;
   wherein the locking device is capable of moving between a first and a second position when the locking post is inserted into the first and second locking holes; in the second position, the locking post is secured by the engaging protrusion due to the restoration force of the elastic unit.

2. The mounting apparatus as claimed in claim 1, wherein the key bar comprises a top surface defining a catching hole therein; the fixing bracket comprises a top board comprising of a catching piece extending therefrom; the elastic unit is a spring; and two ends of the spring are respectively fixed to the catching piece and the catching hole.

3. The mounting apparatus as claimed in claim 1, wherein the key bar comprises a first and a second side surfaces, an elastic piece extending from each of the side surfaces, and each of the elastic pieces comprises a blocking tab extending therefrom;
   the fixing bracket comprises a first and second side boards, a hole is defined in each of the side boards;
   wherein the blocking tabs are movably placed in the holes of the fixing bracket and capable of preventing the key bar from disengaging from the fixing bracket when sliding.

4. The mounting apparatus as claimed in claim 3, wherein:
   the first side board defines a first interference avoiding hole and comprises a first supporting piece adjacent the first interference avoiding hole, and a first sliding block extends from the first side surface;
   the second side board defines a second interference avoiding hole and comprises a second supporting piece adjacent the second interference avoiding hole, and a second sliding block extends from the second side surface;
   the first and second sliding blocks located through the first and second interference avoiding holes and are slidably supported on the first and second supporting pieces.

5. The mounting apparatus as claimed in claim 4, wherein a fixing piece extends from a lower edge of each of the first and second side boards; the fixing pieces are configured for engagement with the computer case, and an access hole is defined in each of the fixing pieces communicating with the first and second interference avoiding holes; wherein the key bar is capable of engaging and disengaging the fixing bracket via the sliding blocks going through first and second access holes of the fixing bracket.

6. The mounting apparatus as claimed in claim 1, wherein the expansion card mount comprises an interface board comprising of a plurality of interfaces, and a fixing board extending from the interface board configured for fixing the expansion board; wherein the locking post extends from the fixing board.

7. The mounting apparatus as claimed in claim 1, wherein the fixing bracket comprises a top board and a first side board extending from an edge of the top board;
   the first locking hole is defined in the first side board and extends into the top board; the key bar comprises a top surface, and a first side surface extending from an edge of the top surface; the second locking hole is defined in the first side surface and extends into the top surface;
   wherein when the locking post is inserted into the locking device, the locking post enters the first locking hole from the first side board and the second locking hole from the first side surface.

8. The mounting apparatus as claimed in claim 7, wherein the first locking hole of the fixing bracket gradually becomes narrower from the first side board to the top board, and a receiving portion is formed adjacent a first end of the first locking hole in the top board, the second locking hole of the key bar gradually becomes narrower from the first side surface to the top surface, and a receiving portion is formed adjacent the engaging protrusion at an end of the second locking hole in the top surface; the receiving portion of the first locking hole and the receiving portion of the second locking hole are configured for receiving the locking post when the locking device is in the second position.

9. A computer comprising:
   a printed circuit board (PCB) comprising of a female connector;
   a bottom plate;
   an expansion card mount comprising of a locking post extending therefrom;
   an expansion board comprising of a male connector and mounted to the expansion card mount;
   a rear plate defining an opening therein sized to allow the expansion board to move through and the expansion card mount to be mounted in; and
   a locking device comprising:
      a fixing bracket mounted to the bottom plate; a first locking hole is defined in the fixing bracket;
      a key bar slidably mounted in the fixing bracket; a second locking hole is defined in the key bar; an engaging protrusion extends into the second locking hole; and
      an elastic unit comprising of two ends, wherein the ends are connected to the fixing bracket and the key bar;
   wherein the first locking hole overlaps with the second locking hole when the elastic unit is in a relaxed state;
   wherein the locking device is capable of moving between a first and a second position when the locking post is inserted into the first and second locking holes; in the second position, the locking post is secured by the engaging protrusion due to the restoration force of the elastic unit.

10. The computer as claimed in claim 9, wherein the elastic unit is a spring; the fixing bracket comprises a catching piece; the key bar defines a catching hole, the two ends of the spring are respectively fixed to the catching piece and the catching hole.

11. The computer as claimed in claim 9, wherein the key bar comprises a first side surface, and an elastic piece extending from the first side surface; the elastic piece comprises a blocking tab; the fixing bracket comprises a first side board and a hole is defined in the first side board; wherein the blocking tab of the key bar is movably placed in the hole of the fixing bracket and capable of preventing the key bar from disengaging from the fixing bracket when sliding.

12. The computer as claimed in claim 9, wherein the fixing bracket comprises a first and a second side boards, each of the first and second side boards defines a first interference avoiding hole, a supporting piece extends from the fixing board adjacent each of the first interference avoiding holes; the key bar comprises a first and a second side surfaces, and two sliding blocks extending from each of the first and second side surfaces; the one sliding block is received in each interference avoiding holes and slidably supported on the corresponding supporting piece.

13. The computer as claimed in claim 12, wherein a fixing piece extends from a lower edges of each of the first and second side boards; the fixing pieces are configure for engaging with the computer case; an access hole is defined in each of the fixing pieces communicating with the first interference avoiding holes of the corresponding one of the first and second side boards; wherein the key bar is capable of engaging and disengaging the fixing bracket via the sliding blocks and through the access holes.

14. The computer as claimed in claim 13, wherein a mounting hole is defined in each of the fixing pieces of the fixing bracket; the bottom plate comprises two mounting posts extending therefrom corresponding to the mounting holes of the fixing bracket, and two elastic hooks extending therefrom corresponding to the access holes of the fixing pieces of the fixing bracket; the elastic hooks are capable of going through the corresponding access holes of the fixing bracket and catching the corresponding fixing pieces of the fixing bracket; the mounting posts are capable of engaging in the corresponding mounting holes of the fixing bracket.

15. The computer as claimed in claim 9, wherein the expansion card mount comprises an interface board and a fixing board; the interface board comprises a plurality of interfaces, the interface board is capable of being mounted in the opening of the rear plate; the fixing board is extending from the interface board, the fixing board is configured for securing the expansion board; the locking post extends from the fixing board.

16. The computer as claimed in claim 15, wherein the rear plate further comprises four lips that are configured for clamping the interface board of the expansion card mount when the expansion card mount is mounted in the opening of the rear plate.

17. The computer as claimed in claim 16, wherein one of the lips comprises an elastic member extending therefrom, the elastic members are configured to engage with the interface board to ground the expansion card mount.

18. A mounting apparatus for mounted an expansion card to a computer case, comprising
an expansion card mount, wherein the expansion card mount comprises a fixing board, the fixing board comprises a locking post; and
a locking device mounted in the computer case;
wherein the computer comprises a PCB, and a rear plate; the PCB comprises a female connector, the rear plate defines an opening; the expansion card comprises a male connector and is fixed to the fixing board; the expansion card together with the expansion card mount is capable of being operated to go through the opening such that the male connector of the expansion card is able to be plugged in the female connector of the PCB; when the locking post of the expansion card mount is locked by the locking device, the expansion card mount is mounted in the opening of the rear plate.

* * * * *